United States Patent
Chiu et al.

(10) Patent No.: US 11,219,827 B2
(45) Date of Patent: Jan. 11, 2022

(54) GAMING KEY MODE ADJUSTING METHOD AND ELECTRONIC DEVICE

(71) Applicant: Acer Incorporated, New Taipei (TW)

(72) Inventors: Chien-Wei Chiu, New Taipei (TW); Ling-Fan Tsao, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/792,303

(22) Filed: Feb. 17, 2020

(65) Prior Publication Data

US 2021/0197090 A1    Jul. 1, 2021

(30) Foreign Application Priority Data

Dec. 31, 2019   (TW) .................................. 108148689

(51) Int. Cl.
*A63F 13/537*   (2014.01)
*G06F 3/023*    (2006.01)

(52) U.S. Cl.
CPC .......... *A63F 13/537* (2014.09); *G06F 3/0238* (2013.01)

(58) Field of Classification Search
CPC .............................. A63F 13/537; G06F 3/0238
See application file for complete search history.

(56) References Cited

U.S. PATENT DOCUMENTS

| | | | | |
|---|---|---|---|---|
| 6,958,757 | B2* | 10/2005 | Karlov | G06T 1/60 345/557 |
| 7,644,922 | B2* | 1/2010 | Fiden | G07F 17/3216 273/138.1 |
| 2013/0196767 | A1* | 8/2013 | Garvin | A63F 13/04 463/36 |

FOREIGN PATENT DOCUMENTS

| | | |
|---|---|---|
| CN | 105477860 | 4/2016 |
| CN | 108764141 | 11/2018 |
| CN | 108970121 | 12/2018 |
| CN | 109771936 | 5/2019 |
| CN | 110354497 | 10/2019 |

* cited by examiner

*Primary Examiner* — Reginald A Renwick
(74) *Attorney, Agent, or Firm* — JCIPRNET

(57) ABSTRACT

A gaming key mode adjusting method and an electronic device are provided. The gaming key mode adjusting method includes: retrieving a display image; determining that the display image corresponds to a gaming scenario; obtain a key mode corresponding to the gaming scenario and process a keyboard input signal according to the key mode. In the key mode, key travels correspond to a plurality of key press values.

6 Claims, 4 Drawing Sheets

GAMING KEY MODE ADJUSTING METHOD AND ELECTRONIC DEVICE

CROSS-REFERENCE TO RELATED APPLICATION

This application claims the priority benefit of Taiwan patent application Ser. No. 108148689, filed on Dec. 31, 2019. The entirety of the above-mentioned patent application is hereby incorporated by reference herein and made a part of this specification.

BACKGROUND

Technical Field

The disclosure relates to a gaming key mode adjusting method and an electronic device; in particular, a gaming key mode adjusting method and an electronic device for adjusting a key mode in real time according to game content.

Description of Related Art

With the increasing impact of games on the economy and society, eSport has become one of the official medal sports. To play different games, users often need to manually adjust keyboard mode settings, which causes inconvenience for the users to play games. Hence, people skilled in the pertinent art should strive for researching how to automatically adjust a key mode to facilitate a game playing process.

SUMMARY

The disclosure provides a gaming key mode adjusting method and an electronic device for adjusting a key mode in real time according to the game content.

In an embodiment of the disclosure, a gaming key mode adjusting method is provided, and the method includes: retrieving a display image; determining that the display image corresponds to the gaming scenario, and obtaining a key mode corresponding to the gaming scenario and processing a keyboard input signal according to the key mode. Here, plural key travels in the key mode correspond to plural key press values.

In an embodiment of the disclosure, an electronic device including a processor is provided. The processor retrieves the display image, determines that the display image corresponds to a gaming scenario, and obtains a key mode corresponding to the gaming scenario and processing a keyboard input signal according to the key mode. In the key mode, plural key travels correspond to plural key press values.

In view of the above, in the gaming key mode adjusting method and the electronic device as provided in one or more embodiments of the disclosure, the display image may be retrieved, and the gaming scenario corresponding to the display image may be automatically determined, so as to obtain the key mode corresponding to gaming scenario and process the keyboard input signal according to the key mode. Hence, when a user switches to a different game or switches to another game mode in the same game, the electronic device may automatically apply the corresponding key mode instead of quitting the game for manual settings.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1:
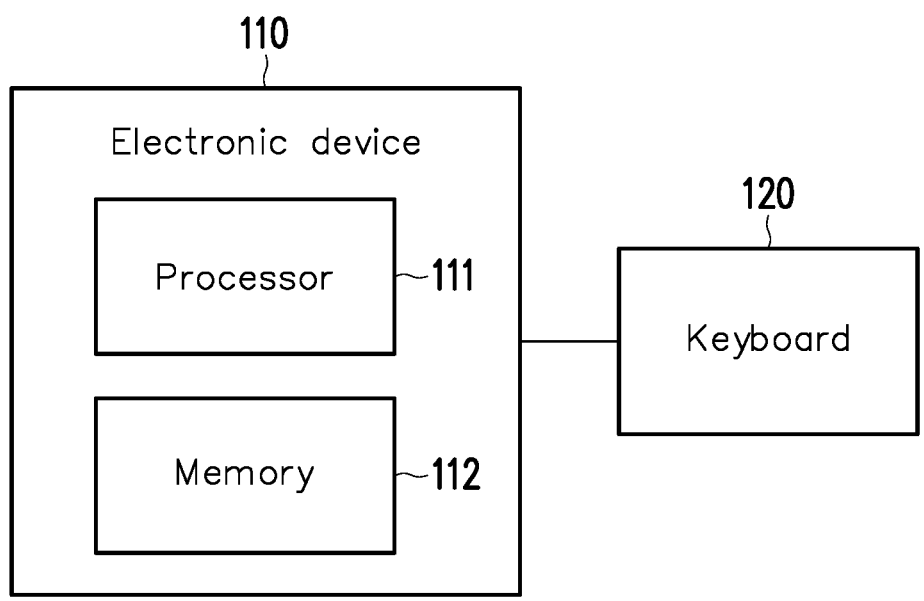
FIG. 1 is a block diagram of an electronic device according to an embodiment of the disclosure.

FIG. 1 is a block diagram of an electronic device according to an embodiment of the disclosure.

With reference to FIG. 1, an electronic device 110 provided in an embodiment of the disclosure includes a processor 111 and a memory 112. The processor 111 is, for instance, a central processing unit (CPU) or another similar element. The memory 112 is, for instance, any volatile memory or non-volatile memory. In an embedment, the electronic device 110 may be a notebook computer, and a keyboard 120 may be a notebook computer keyboard, or an external cable/wireless keyboard. In another embedment, the electronic device 110 is a personal computer, and the keyboard is an external cable/wireless keyboard. The way to couple the keyboard 120 to the electronic device 110 is not limited in the disclosure.

In an embedment, the keyboard 120 may include at least part of linear key switches. For instance, the key travel of the linear switch may be between 0 mm and 2.8 mm, and the key travel between 0 mm and 2.8 mm may correspond to a key press value of 0-255. The correspondence relationship between the key travel and the key press value may be linear correspondence or non-linear correspondence.

In an embedment, the processor 111 may retrieve a display image and determine that the display image corresponds to a gaming scenario. The processor 111 obtains a key mode corresponding to the gaming scenario and processes a keyboard input signal according to the key mode. In the key mode, plural key travels correspond to plural key press values.

Figure 2:
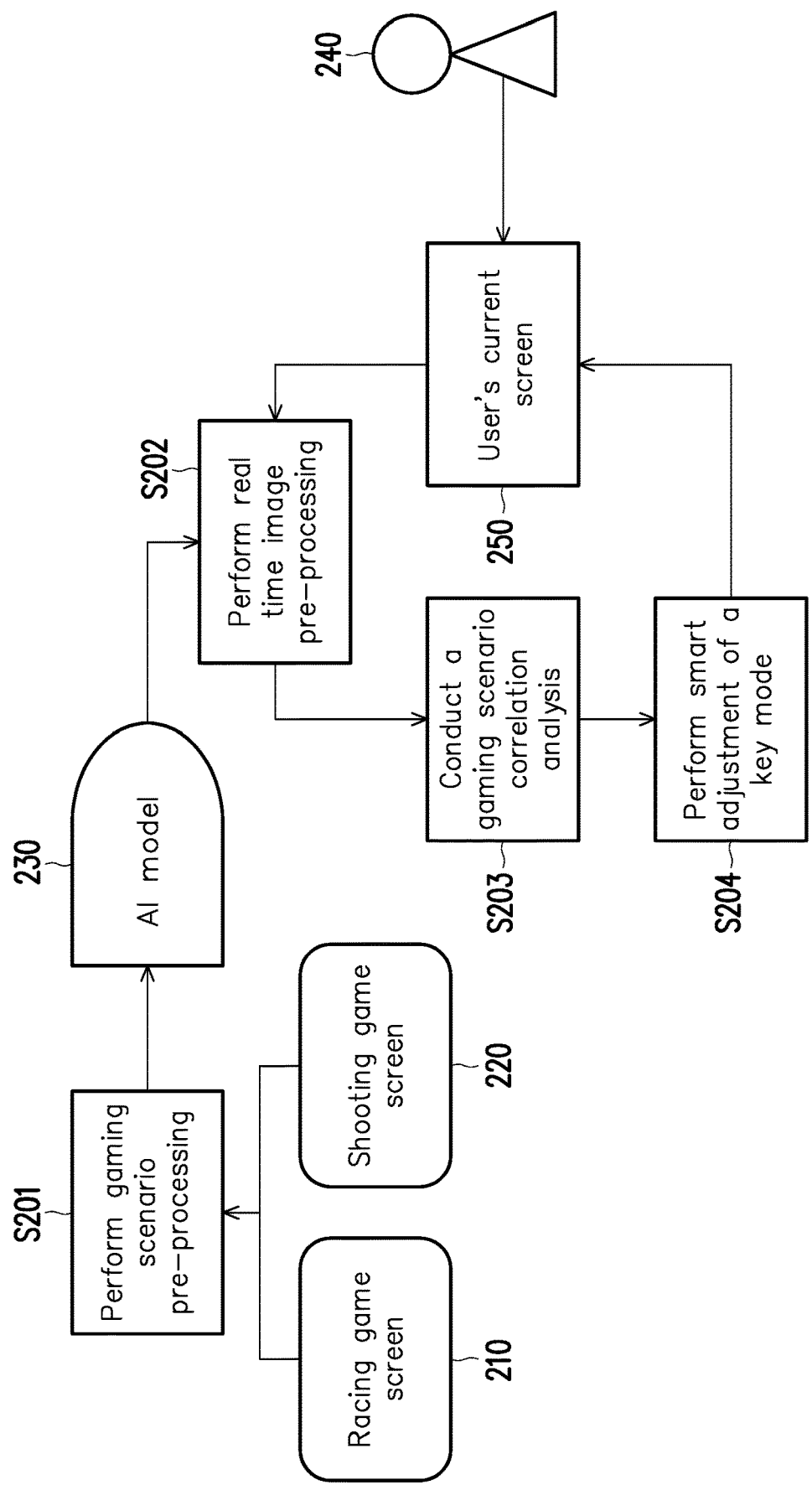
FIG. 2 is a flowchart of a gaming key mode adjusting method according to an embodiment of the disclosure.
Figure 3:
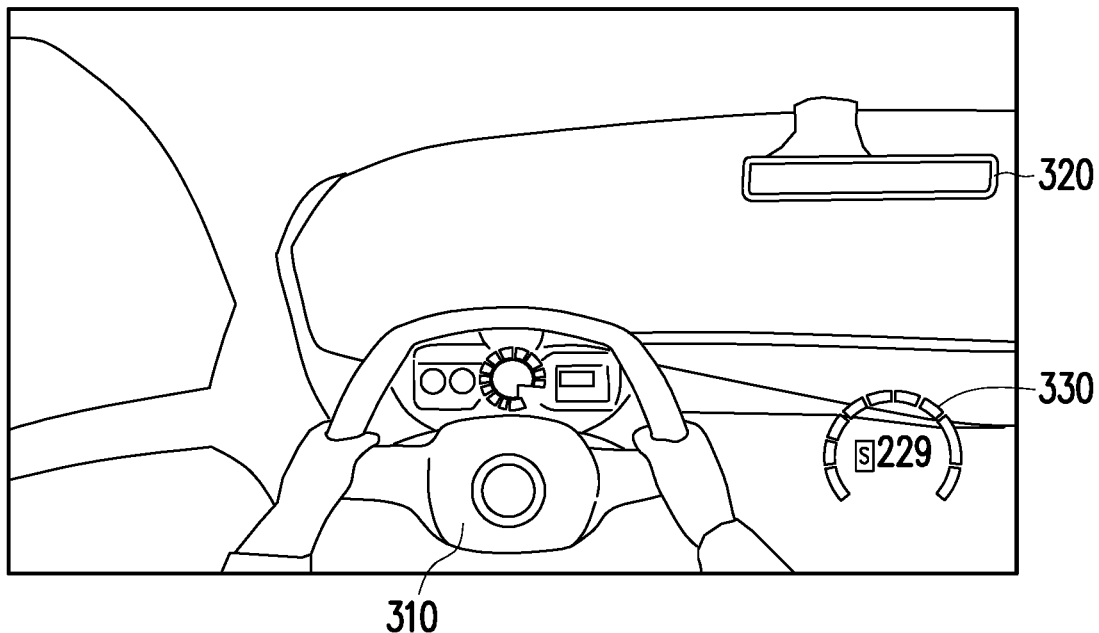
FIG. 3 is a schematic diagram of object recognition in a racing game according to an embodiment of the disclosure.

FIG. 2 is a flowchart of a gaming key mode adjusting method according to an embodiment of the disclosure. FIG. 3 is a schematic diagram of object recognition in a racing game according to an embodiment of the disclosure.

With reference to FIG. 1 to FIG. 3, during a training process, a racing game screen 210 or a shooting game screen 220 can be used to perform gaming scenario pre-processing (S201) to train an artificial intelligence (AI) model 230. The AI model 230 may be stored or temporarily registered in the memory 112 of the electronic device 110. For instance, as shown in FIG. 3, objects including a steering wheel 310, a rear-view mirror 320, and a dashboard 330 in the racing game or objects including a gun and a mini-map in the shooting game may serve to train the AI model 230, so that the AI model 230 is able to determine the game screen and classify the gaming scenario. The trained AI model 230 may be stored or temporarily registered in the memory 112.

When a user 240 plays a game, the processor 111 retrieves the user's current screen 250 through a window application interface (Windows API) and applies the trained AI model 230 to perform real time image pre-processing (S202), so as to determine specific objects in the game screen. Table I provided below is a list of gaming scenarios according to an embodiment of the disclosure.

TABLE I

| Gaming Scenario | Game Screen Object |
|---|---|
| Racing game | Steering wheel |
|  | Motor vehicle |
|  | Rear-view mirror |
|  | Dashboard |
|  | Marking |
| Shooting game | Gun |
|  | Knife |
|  | Telescope |
|  | Magazine |
|  | Grenade |
| Miscellaneous | N/A |

It is then determined that the game screen objects may be input for conducting a gaming scenario correlation analysis (S203), as shown in Table II below.

greater than a predetermined percentage (e.g., 50%), it is determined that the display image corresponds to the shooting gaming scenario.

Figure 4A:
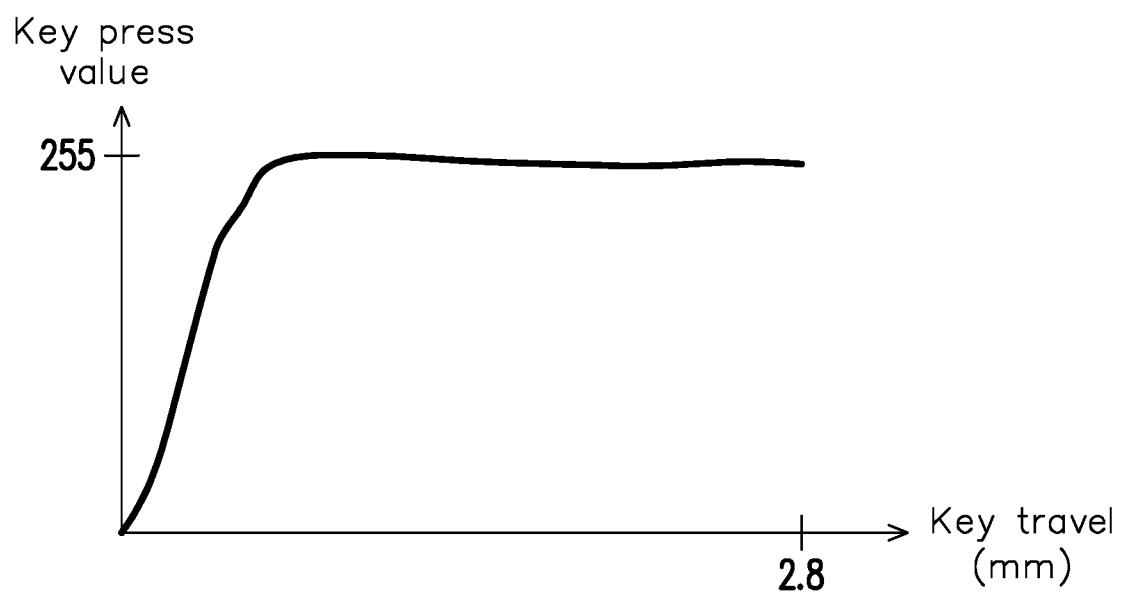
FIG. 4A is a schematic diagram of an analog curve corresponding to a racing gaming scenario according to an embodiment of the disclosure.
Figure 4B:
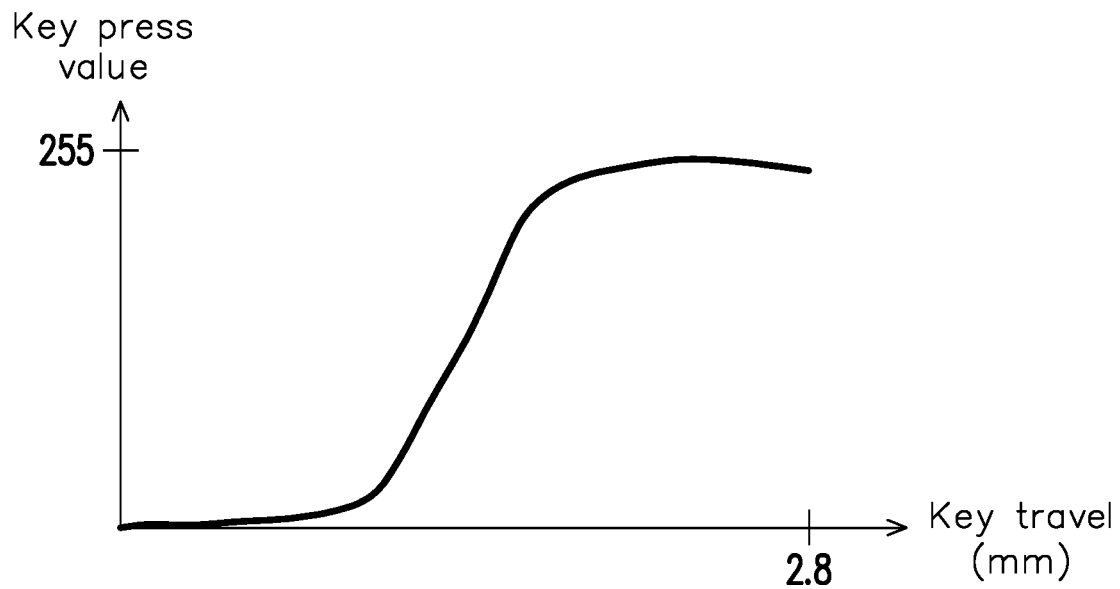
FIG. 4B is a schematic diagram of an analog curve corresponding to a shooting gaming scenario according to an embodiment of the disclosure.
Figure 4C:
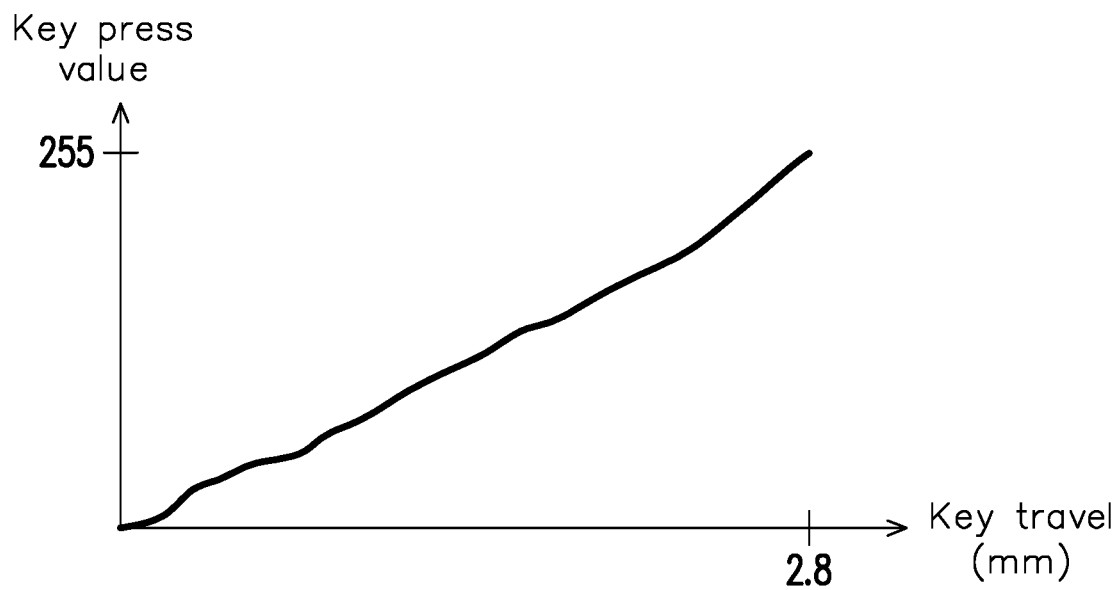
FIG. 4C is a schematic diagram of an analog curve corresponding to a miscellaneous scenario according to an embodiment of the disclosure.

After determining that the display image corresponds to the racing gaming scenario, the shooting gaming scenario, or a miscellaneous scenario, smart adjustment of the key mode may be performed (S204). FIG. 4A is a schematic diagram of an analog curve corresponding to a racing gaming scenario according to an embodiment of the disclosure. With reference to FIG. 4A, since the racing game requires sensitive press control to seize the moment of overtaking other vehicles, the maximum key press value is generated when the key travel is short (e.g., within the key travel of 0.5 mm). FIG. 4B is a schematic diagram of an analog curve corresponding to a shooting gaming scenario according to an embodiment of the disclosure. With reference to FIG. 4B, since the shooting game requires subtle press control to move characters slowly to prevent the opponent from observing the movement, the actuation point of the key travel (e.g., 0 mm to 1.0 mm) will be close to 0 for the user's convenience. FIG. 4C is a schematic diagram of an analog curve corresponding to a miscellaneous scenario according to an embodiment of the disclosure. With reference to FIG. 4C, the analog curve corresponding to a miscellaneous scenario may be in a linear mode, so as to better stabilize the output of the key press.

A game called "Grand Theft Auto (GTA)" is taken as an example. In GTA, when a user finds a car on the roadside and is going to drive away from the police and go to the next

TABLE II

| Timestamp | Object | | | | | Weight | Scenario |
|---|---|---|---|---|---|---|---|
| 000001 | Steering wheel | Motor vehicle | Rear-view mirror | Dashboard | Marking | Racing * 4 | Racing game |
|  | ○ | X | ○ | ○ | ○ |  |  |
|  | Gun | Knife | Telescope | Grenade | Magazine | Shooting * 0 |  |
|  | X | X | X | X | X |  |  |
| 000002 | Steering wheel | Motor vehicle | Rear-view mirror | Dashboard | Marking | Racing * 4 | Racing game |
|  | ○ | X | ○ | ○ | ○ |  |  |
|  | Gun | Knife | Telescope | Grenade | Magazine | Shooting * 0 |  |
|  | X | X | X | X | X |  |  |
| 000003 | Steering wheel | Motor vehicle | Rear-view mirror | Dashboard | Marking | Racing * 5 | Racing game |
|  | ○ | ○ | ○ | ○ | ○ |  |  |
|  | Gun | Knife | Telescope | Grenade | Magazine | Shooting * 0 |  |
|  | X | X | X | X | X |  |  |
| 000004 | Steering wheel | Motor vehicle e | Rear-view mirror | Dashboard | Marking | Racing * 0 | Other situations |
|  | X | X | X | X | X |  |  |
|  | Gun | Knife | Telescope | Grenade | Magazine | Shooting * 0 |  |
|  | X | X | X | X | X |  |  |
| 000005 | Steering wheel | Motor vehicle | Rear-view mirror | Dashboard | Marking | Racing * 0 | Other situations |
|  | X | X | X | X | X |  |  |
|  | Gun | Knife | Telescope | Grenade | Magazine | Shooting * 0 |  |
|  | X | X | X | X | X |  |  |
| 000006 | Steering wheel | Motor vehicle | Rear-view mirror | Dashboard | Marking | Racing * 0 | Shooting game |
|  | X | X | X | X | X |  |  |
|  | Gun | Knife | Telescope | Grenade | Magazine | Shooting * 3 |  |
|  | ○ | X | ○ | X | ○ |  |  |
| 000007 | Steering wheel | Motor vehicle | Rear-view mirror | Dashboard | Marking | Racing * 0 | Shooting game |
|  | X | X | X | X | X |  |  |
|  | Gun | Knife | Telescope | Grenade | Magazine | Shooting * 4 |  |
|  | X | ○ | ○ | ○ | ○ |  |  |

For instance, in the timestamp 000006, when a quotient obtained by dividing the number of recognized objects (i.e., 3) by the number of the predetermined objects (i.e., 5) is location for a mission, as soon as the user enters the screen of driving a car, according to the gaming key mode adjusting method provided in one or more embodiments of the disclosure, the current gaming scenario may be determined as the racing scenario based on the steering wheel, the dashboard, and the rear-view mirror in the screen, and the key mode of the keyboard is switched to a racing key mode, whereby the user may more easily control the vehicle to obtain good gaming experience. If the vehicle controlled by the user is damaged during the game, and the user is forced to get off the vehicle to engage in a gun battle with the police, the game screen will be converted to a first-person shooting game screen, and the user needs to hide from the police and launch counterattacks through delicate control actions. At this time, the current gaming scenario may be determined as the shooting scenario based on the gun, the knife, and the telescope in the screen, and the key mode of the keyboard is switched to a shooting key mode, whereby the user may smoothly play the game in no need of exiting the game screen to manually switch the key mode. The explanation provided above is directed to actions of automatically switching between different key modes in the same game, which should however not be construed as a limitation in the disclosure. According to the gaming key mode adjusting method provided herein, it is also likely to automatically switch between different key modes in different games.

To sum up, according to the gaming key mode adjusting method and in the electronic device provided in one or more embodiments of the disclosure, the display image is retrieved, and the corresponding gaming scenario is automatically determined to obtain the corresponding key mode and process the keyboard input signal according to the key mode. As a result, when the user switches to play different games or switches between different game modes in the same game, the electronic device provided herein may automatically apply the corresponding key mode in no need of exiting the game for manual settings.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A gaming key mode adjusting method, comprising:
   retrieving a display image;
   recognizing a plurality of objects included in the display image to determine a gaming scenario; and
   switching to a key mode corresponding to the gaming scenario and processing a keyboard input signal according to the key mode, a plurality of key travels in the key mode corresponding to a plurality of key press values,
   wherein the gaming scenario corresponds to a plurality of predetermined objects, and when a quotient obtained by dividing the number of the recognized objects by the number of the predetermined objects is greater than a predetermined percentage, it is determined that the display image corresponds to the gaming scenario.

2. The gaming key mode adjusting method according to claim 1, further comprising: training an artificial intelligence model according to the display image including the objects and determining the gaming scenario according to the artificial intelligence model.

3. The gaming key mode adjusting method according to claim 1, wherein the gaming scenario comprises a racing scenario, a shooting scenario, and a miscellaneous scenario.

4. An electronic device, comprising:
   a processor, retrieving a display image, recognizing a plurality of objects included in the display image to determine a gaming scenario, and switching to a key mode corresponding to the gaming scenario and processing a keyboard input signal according to the key mode, a plurality of key travels corresponding to a plurality of key press values,
   wherein the gaming scenario corresponds to a plurality of predetermined objects, and when a quotient obtained by dividing the number of the recognized objects by the number of the predetermined objects is greater than a predetermined percentage, it is determined that the display image corresponds to the gaming scenario.

5. The electronic device according to claim 4, wherein the processor trains an artificial intelligence model according to the display image including the objects and determines the gaming scenario according to the artificial intelligence model.

6. The electronic device according to claim 4, wherein the gaming scenario comprises a racing scenario, a shooting scenario, and a miscellaneous scenario.

* * * * *